US012706102B2

(12) United States Patent
Laitinen et al.

(10) Patent No.: US 12,706,102 B2
(45) Date of Patent: Aug. 11, 2026

(54) SEPARATING SPATIAL AUDIO OBJECTS

(71) Applicant: NOKIA TECHNOLOGIES OY, Espoo (FI)

(72) Inventors: Mikko-Ville Laitinen, Espoo (FI); Anssi Sakari Rämö, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 98 days.

(21) Appl. No.: 18/554,234

(22) PCT Filed: Apr. 8, 2021

(86) PCT No.: PCT/FI2021/050257
§ 371 (c)(1),
(2) Date: Oct. 6, 2023

(87) PCT Pub. No.: WO2022/214730
PCT Pub. Date: Oct. 13, 2022

(65) Prior Publication Data

US 2025/0279103 A1 Sep. 4, 2025

(51) Int. Cl.
*G10L 19/008* (2013.01)
*G10L 25/21* (2013.01)
*H04S 3/00* (2006.01)

(52) U.S. Cl.
CPC ............ *G10L 19/008* (2013.01); *G10L 25/21* (2013.01)

(58) Field of Classification Search
CPC ............... G10L 21/0272; G10L 19/008; G10L 21/0308; G10L 25/30; G10L 19/20;
(Continued)

(56) References Cited

U.S. PATENT DOCUMENTS

2007/0140499 A1* 6/2007 Davis .................... G10L 19/018 381/23
2015/0142453 A1* 5/2015 Oomen ................. G10L 19/265 704/500

(Continued)

FOREIGN PATENT DOCUMENTS

WO WO 2010/076040 A1 7/2010
WO WO 2014/099285 A1 6/2014

(Continued)

OTHER PUBLICATIONS

Engdegard et al., "Spatial Audio Object Coding (SAOC)—The Upcoming MPEG Standard on Parametric Object Based Audio Coding", Audio Engineering Society 124th Convention, (May 1, 2008), 15 pages.

(Continued)

*Primary Examiner* — Leshui Zhang
(74) *Attorney, Agent, or Firm* — ALSTON & BIRD LLP

(57) ABSTRACT

There is inter alia disclosed an apparatus for spatial audio encoding configured to: determine an audio object for separation (306) from a plurality of audio objects of an audio frame (1281); separate the audio object for separation (308) from the plurality of audio objects to provide a separated audio object (126) and at least one remaining audio object (124); encode the separated audio object with an audio object encoder; and encode the plurality of remaining audio objects together with another input audio format.

13 Claims, 4 Drawing Sheets

(58) Field of Classification Search
CPC ... G10L 21/028; G10L 25/21; G10L 19/0204; G10L 25/60; G10L 19/00; G10L 25/18; G10L 25/51; G10L 19/018; G10L 19/02; G10L 19/0208; G10L 17/02; G10L 19/167; G10L 19/173; G10L 19/24; G10L 19/26; G10L 19/265; G10L 21/0232; G10L 25/03; G10L 25/06; G10L 19/002; H04R 1/406; H04R 2430/20; H04R 2430/23; H04R 5/027; H04R 3/12; H04S 2400/15; H04S 3/008; H04S 7/305; H04S 2420/03; H04S 2400/11; H04S 2420/11; H04S 7/30
USPC .................... 704/500–504; 381/1–23; 700/94
See application file for complete search history.

(56) References Cited

U.S. PATENT DOCUMENTS

| | | | | |
|---|---|---|---|---|
| 2016/0373877 | A1 | 12/2016 | Laitinen | |
| 2017/0194014 | A1* | 7/2017 | Kim | G10L 19/20 |
| 2022/0007126 | A1* | 1/2022 | Bruhn | H04R 3/005 |
| 2024/0185869 | A1 | 6/2024 | Laitinen et al. | |

FOREIGN PATENT DOCUMENTS

| | | | | |
|---|---|---|---|---|
| WO | WO 2017/005978 | A1 | 1/2017 | |
| WO | WO 2019/086757 | A1 | 5/2019 | |
| WO | WO-2020102156 | A1 * | 5/2020 | H04R 3/005 |
| WO | 2021/053266 | A2 | 3/2021 | |
| WO | WO 2021/058856 | A1 | 4/2021 | |

OTHER PUBLICATIONS

Extended European Search Report for European Application No. 21935901.5 dated Oct. 9, 2024, 7 pages.

International Search Report and Written Opinion for Patent Cooperation Treaty Application No. PCT/FI2021/050257 dated Feb. 16, 2022, 15 pages.

Nokia Corporation, "Proposal for MASA common metadata and metadata structure", 3GPP TSG-SA4 #101 Meeting, S4-181353, (Nov. 19-23, 2018), 4 pages.

First Examination Report for Indian Application No. 202317073943 dated Apr. 8, 2026, 8 pages.

* cited by examiner

SEPARATING SPATIAL AUDIO OBJECTS

CROSS-REFERENCE TO RELATED APPLICATIONS

This application is a national phase entry of International Application No. PCT/FI2021/050257, filed Apr. 8, 2021, the contents of which are hereby incorporated by reference in their entirety.

FIELD

The present application relates to apparatus and methods for encoding audio objects

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

The above processes may involve obtaining the directional parameters, such as azimuth and elevation, and energy ratio as spatial metadata through the multi-channel analysis in time-frequency domain. On the other hand, the directional metadata and audio object signals for individual audio objects may be processed in a separate processing chain. However, possible synergies in the processing of different types of audio signals are not efficiently utilised if some audio signals are processed separately.

SUMMARY

There is according to a first aspect a method for spatial audio encoding comprising: determining an audio object for separation from a plurality of audio objects of an audio frame; separating the audio object for separation from the plurality of audio objects to provide a separated audio object and at least one remaining audio object. encoding the separated audio object with an audio object encoder; and encoding the plurality of remaining audio objects together with another input audio format Each audio object of the plurality of audio objects may comprise an audio object signal and an audio object metadata, wherein determining an audio object for separation from the plurality of audio objects of the audio frame may comprise: determining the energy of each of the plurality of audio object signals over the audio frame; determining the energy of at least one audio signal of the other input audio format over the audio frame; determining a loudest energy by selecting a largest energy from the energies of the plurality of audio object signals; determining an energy proportion factor; determining a threshold value for the audio frame according to the energy proportion factor; determining a ratio of the loudest energy to the energy of a separated audio object for a previous audio frame calculated over the audio frame; comparing the ratio of the loudest energy to the energy of the separated audio object for the previous audio frame calculated over the audio frame against the threshold value; and depending on the comparison, identifying for the audio frame either the audio object corresponding to the loudest energy as the audio object for separation, or the separated audio object for the previous audio frame as the audio object for separation.

The determining the energy proportion factor may comprise: determining a total energy by summing the energy of each of the plurality of audio object signals over the audio frame, the energy of each of a plurality of audio object signals over the previous audio frame, the energy of the at least one audio signal of the other audio input format over the audio frame and the energy of the at least one audio signal of the other audio input format over the previous audio frame; and determining the ratio of the sum energy of the loudest energy, a loudest energy from the previous audio frame, the energy of the separated audio object for the previous audio frame calculated over the audio frame and an energy of the separated audio object for the previous audio frame calculated over the audio frame to the total energy.

Determining the audio object from the plurality of audio objects for the audio frame may further comprise determining a manner of transition by which a change from a separated audio object for the previous audio frame to the separated audio object for the audio frame is performed.

Determining the manner of transition may comprise: comparing the energy proportion factor against a threshold; determining that the manner of transition from the separated audio object for the previous audio frame to a separated audio object for the audio frame is performed using a hard transition when the energy proportion factor is less than the threshold; and determining that the manner of transition from the separated audio object for the previous audio frame to the separated audio object for the audio frame is performed using a fade out fade in transition when the energy proportion factor is greater than or equal to the threshold.

Separating the audio object for separation from the plurality of audio objects to provide the separated audio object and at least one remaining audio object may comprise: setting for the at least one remaining audio object the audio object signal of the identified audio object for separation to zero; setting metadata of the separated audio object for the audio frame as metadata of the identified audio object for separation; setting audio object signal of the separated audio object for the audio frame as the audio object signal of the identified audio object for separation; setting audio object signals of the at least one of remaining audio objects as the audio object signals of audio objects not identified for separation; and setting metadata of the at least one of remaining audio objects as the metadata of audio objects not identified for separation.

In the above the manner of transition from the separated audio object for the previous audio frame to a separated audio object for the audio frame may be performed using a hard transition.

Separating the audio object for separation from the plurality of audio objects to provide the separated audio object and at least one remaining audio object further may comprise separating the audio object for separation from the plurality of audio objects to provide the separated audio object for at least one following audio frame and a plurality of remaining audio objects for the at least one following audio frame, wherein that least one following audio frame follows the audio frame, wherein the method may further comprise: setting the audio object signal of the separated audio object for the audio frame as the audio object signal of the audio frame of the separated audio object for the previous audio frame multiplied by a fading out window function; setting audio object signal of the separated audio object for the at least one following audio frame as the audio object signal of the at least one following audio frame of the audio object for separation multiplied by a fading in window function; setting an audio object signal corresponding to the separated audio object for the previous audio frame within the at least one remaining audio object for the audio frame as the audio object signal for the audio frame of the separated audio object from the previous audio multiplied by a fading in window function; and setting an audio object signal corresponding to the separated audio object for the audio frame within the at least one remaining audio object for the at least one following audio frame as the audio object signal of the audio object for separation multiplied by a fading out window function.

The method may further comprise: setting metadata of the at least one remaining audio object for the audio frame as the metadata of audio objects not identified for separation for the audio frame; setting metadata of the at least one remaining audio object for the at least one following audio frame as the metadata of audio objects not identified for separation for the at least one following audio frame; setting metadata of the separated audio object for the audio frame as metadata of the audio object for separation for the audio frame; and setting metadata of the separated audio object for the at least one following audio frame as metadata of an audio object for separation for the at least one following audio frame.

In the above the manner of transition from the separated audio object for the previous audio frame to a separated audio object for the audio frame may be performed using a fade in fade out transition.

The fading out window function may be a latter half of a Hann window function and wherein the fading in window function may be one minus the latter half of the Hann window function.

Determining the energy of each of the plurality of audio object signals over an audio frame may further comprise smoothing the energy of each of the plurality of audio object signals by using an energy of a corresponding audio object signal from a previous audio frame, and wherein determining the energy of the plurality of audio transport signals over the audio frame further comprises smoothing the energy of the each of the plurality of audio signals by using a corresponding energy for each of the plurality of audio signals from the previous audio frame.

The other input audio format may comprise at least one of: at least one audio signal and an input audio format metadata set; and at least two audio signals.

There is provided according to a second aspect an apparatus for spatial audio encoding comprising means for: determining an audio object for separation from a plurality of audio objects of an audio frame; separating the audio object for separation from the plurality of audio objects to provide a separated audio object and at least one remaining audio object; encoding the separated audio object with an audio object encoder; and encoding the plurality of remaining audio objects together with another input audio format.

Each audio object of the plurality of audio objects may comprise an audio object signal and an audio object metadata, wherein the means for determining an audio object for separation from the plurality of audio objects of the audio frame may comprise means for: determining the energy of each of the plurality of audio object signals over the audio frame; determining the energy of at least one audio signal of the other input audio format over the audio frame; determining a loudest energy by selecting a largest energy from the energies of the plurality of audio object signals; determining an energy proportion factor; determining a threshold value for the audio frame according to the energy proportion factor; determining a ratio of the loudest energy to the energy of a separated audio object for a previous audio frame calculated over the audio frame; comparing the ratio of the loudest energy to the energy of the separated audio object for the previous audio frame calculated over the audio frame against the threshold value; and depending on the comparison, identifying for the audio frame either the audio object corresponding to the loudest energy as the audio object for separation, or the separated audio object for the previous audio frame as the audio object for separation.

The means for determining the energy proportion factor may comprise means for: determining a total energy by summing the energy of each of the plurality of audio object signals over the audio frame, the energy of each of a plurality of audio object signals over the previous audio frame, the energy of the at least one audio signal of the other audio input format over the audio frame and the energy of the at least one audio signal of the other audio input format over the previous audio frame; and determining the ratio of the sum energy of the loudest energy, a loudest energy from the previous audio frame, the energy of the separated audio object for the previous audio frame calculated over the audio frame and an energy of the separated audio object for the previous audio frame calculated over the audio frame to the total energy.

The means for determining the audio object from the plurality of audio objects for the audio frame further may comprise means for determining a manner of transition by which a change from a separated audio object for the previous audio frame to the separated audio object for the audio frame is performed.

The means for determining the manner of transition may comprise means for: comparing the energy proportion factor against a threshold; determining that the manner of transition from the separated audio object for the previous audio frame to a separated audio object for the audio frame is performed using a hard transition when the energy proportion factor is less than the threshold; and determining that the manner of transition from the separated audio object for the previous audio frame to the separated audio object for the audio frame is performed using a fade out fade in transition when the energy proportion factor is greater than or equal to the threshold.

The means for separating the audio object for separation from the plurality of audio objects to provide the separated audio object and at least one remaining audio object may comprise means for: setting for the at least one remaining audio object the audio object signal of the identified audio object for separation to zero; setting metadata of the separated audio object for the audio frame as metadata of the identified audio object for separation; setting audio object signal of the separated audio object for the audio frame as the audio object signal of the identified audio object for separation; setting audio object signals of the at least one of remaining audio objects as the audio object signals of audio objects not identified for separation; and setting metadata of the at least one of remaining audio objects as the metadata of audio objects not identified for separation.

In the above the manner of transition from the separated audio object for the previous audio frame to a separated audio object for the audio frame may be performed using the hard transition.

The means for separating the audio object for separation from the plurality of audio objects to provide the separated audio object and at least one remaining audio object may further comprise separating the audio object for separation from the plurality of audio objects to provide the separated audio object for at least one following audio frame and a plurality of remaining audio objects for the at least one following audio frame, wherein that least one following audio frame may follow the audio frame, wherein the apparatus may further comprise means for: setting the audio object signal of the separated audio object for the audio frame as the audio object signal of the audio frame of the separated audio object for the previous audio frame multiplied by a fading out window function; setting audio object signal of the separated audio object for the at least one following audio frame as the audio object signal of the at least one following audio frame of the audio object for separation multiplied by a fading in window function; setting an audio object signal corresponding to the separated audio object for the previous audio frame within the at least one remaining audio object for the audio frame as the audio object signal for the audio frame of the separated audio object from the previous audio multiplied by a fading in window function; and setting an audio object signal corresponding to the separated audio object for the audio frame within the at least one remaining audio object for the at least one following audio frame as the audio object signal of the audio object for separation multiplied by a fading out window function.

The apparatus may further comprise means for: setting metadata of the at least one remaining audio objects for the audio frame as the metadata of audio objects not identified for separation for the audio frame; setting metadata of the at least one remaining audio objects for the at least one following audio frame as the metadata of audio objects not identified for separation for the at least one following audio frame; setting metadata of the separated audio object for the audio frame as metadata of the audio object for separation for the audio frame; and setting metadata of the separated audio object for the at least one following audio frame as metadata of an audio object for separation for the at least one following audio frame.

In the above the manner of transition from the separated audio object for the previous audio frame to a separated audio object for the audio frame may be performed using the fade in fade out transition.

The fading out window function may be a latter half of a Hann window function and wherein the fading in window function may be one minus the latter half of the Hann window function.

Determining the energy of each of the plurality of audio object signals over an audio frame may further comprise smoothing the energy of each of the plurality of audio object signals by using an energy of a corresponding audio object signal from a previous audio frame, and wherein determining the energy of the plurality of audio transport signals over the audio frame may further comprise smoothing the energy of the each of the plurality of audio signals by using a corresponding energy for each of the plurality of audio signals from the previous audio frame.

The other input audio format may comprise at least one of: at least one audio signal and an input audio format metadata set; and at least two audio signals.

According to a third aspect there is an apparatus for spatial audio encoding comprising at least one processor and at least one memory including computer program code, the at least one memory and the computer program code configured to determine an audio object for separation from a plurality of audio objects of an audio frame; separate the audio object for separation from the plurality of audio objects to provide a separated audio object and at least one remaining audio object; encode the separated audio object with an audio object encoder; and encode the plurality of remaining audio objects together with another input audio format.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS

Figure 1:
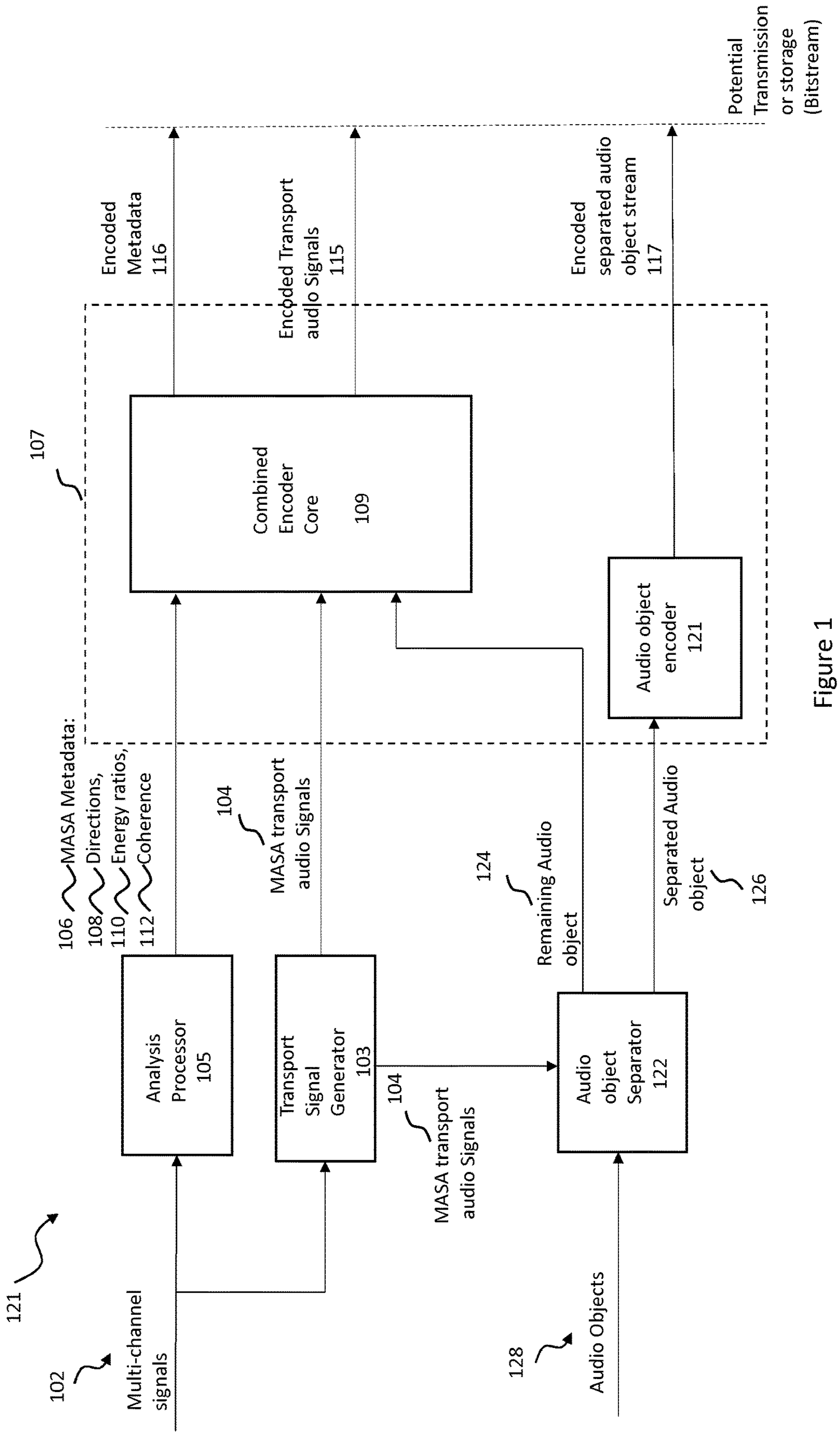
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

Metadata-assisted spatial audio (MASA) is one input format proposed for IVAS. MASA input format may comprise a number of audio signals (1 or 2 for example) together with corresponding spatial metadata. The MASA input stream may be captured using spatial audio capture with a microphone array which may be mounted in a mobile device for example. The spatial audio parameters may then be estimated from the captured microphone signals.

The MASA spatial metadata may consist at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which make up the spatial metadata for MASA are shown in Table 1 below.

-continued

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

In addition to multi-channel input signals, which are then subsequently encoded as MASA audio signals, an encoding system may also be required to encode audio objects representing various sound sources. Each audio object can be accompanied, whether it is in the form of metadata or some other mechanism, by directional data in the form of azimuth and elevation values which indicate the position of an audio object within a physical space. Typically, an audio object may have one directional parameter value per audio frame.

The concept as discussed hereafter is to improve the encoding of multiple inputs into a spatial audio coding system such as the IVAS system. Whilst such a system is presented with multi-channel audio signal stream as discussed above and a separate input stream of audio objects, it is envisaged that other combinations of input audio signals could be used. Embodiments encapsulating the concept discussed hereafter may proceed on the premise that similarities between the various different input audio streams may be exploited to improve the overall coding efficiency. In order to achieve this, it may be advantageous to have a functional mechanism which enables an audio object stream to be separated into audio objects which can be encoded together with other input audio signals (in order to exploit synergies between the audio signals) and audio objects which are encoded using dedicated audio object encoding coding techniques. To that end, efficiencies in encoding may be achieved by combining the encoding of the separated audio objects with other audio input streams such as the MASA audio signal stream.

In this regard FIG. 1 depicts an example apparatus and system for implementing embodiments of the application. The system is shown with an 'analysis' part 121. The 'analysis' part 121 is the part from receiving the multi-channel signals up to an encoding of the metadata and downmix signal.

The input to the system 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial (MASA) metadata associated with the audio signals may be provided to an encoder as a separate bit-stream. In some embodiments the spatial (MASA) metadata may be provided as a set of spatial (direction) index values.

Additionally, FIG. 1 also depicts multiple audio objects 128 as a further input to the analysis part 121 and audio object stream comprising a plurality of objects. As mentioned above these multiple audio objects (or audio object stream) 128 may represent various sound sources within a physical space. Each audio object may be characterized by an audio object signal and accompanying metadata comprising directional data (in the form of azimuth and elevation values) which indicate the position of the audio object within a physical space on an audio frame basis.

The multi-channel signals 102 are passed to a transport signal generator 103 and to an analysis processor 105.

In some embodiments the transport signal generator 103 is configured to receive the multi-channel signals and generate a suitable transport signal comprising a determined number of channels and output the transport signals 104 (MASA transport audio signals). For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be MASA spatial audio parameters (or MASA metadata). In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The MASA transport signals 104 and the MASA metadata 106 may be passed to an encoder 107.

The audio objects 128 may be passed to the audio object separator 122 for processing. In other embodiments, the audio object separator 122 may be sited within the functionality of the encoder 107.

Figure 3:
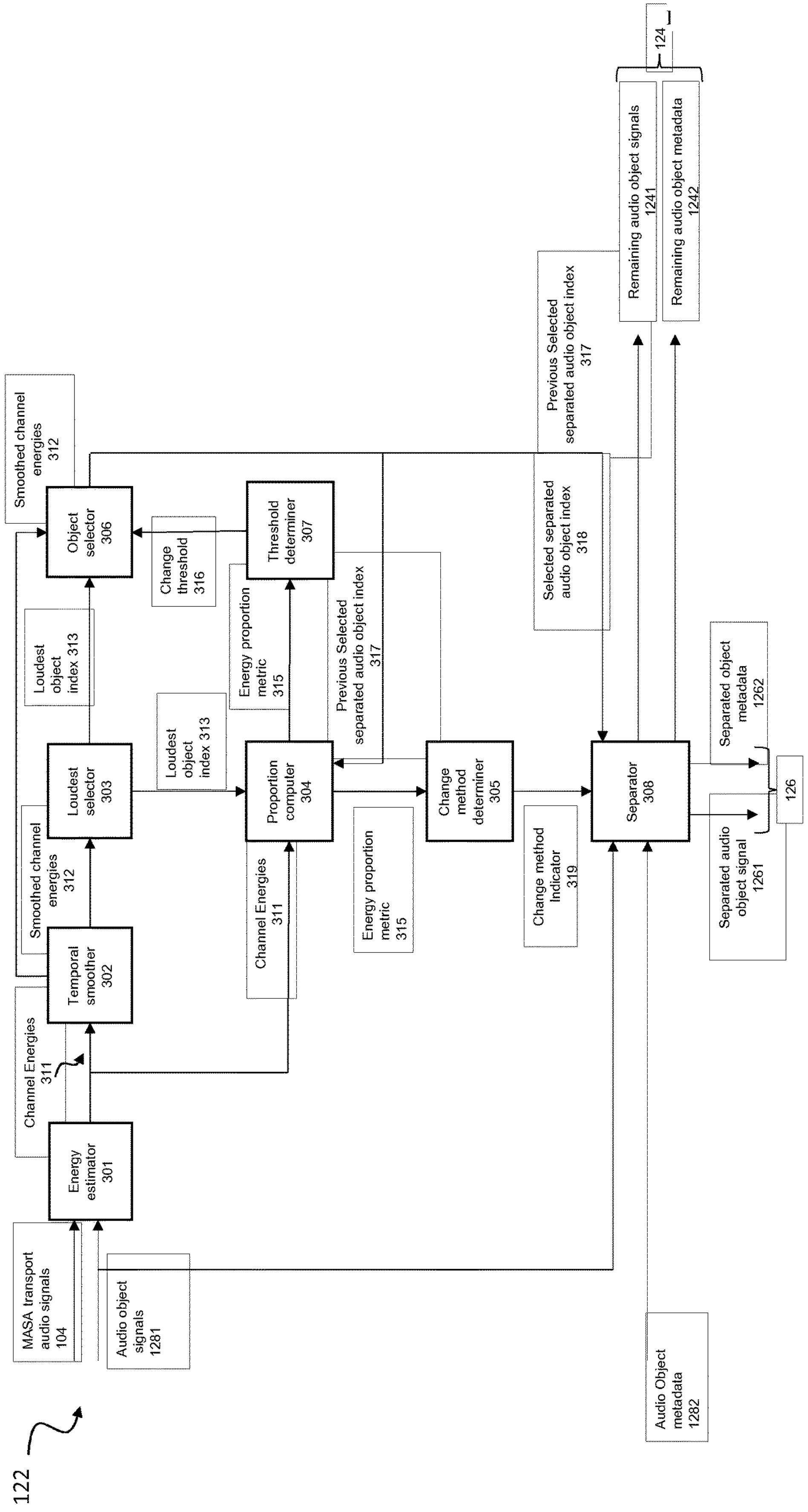
FIG. 3 shows schematically an audio object separator apparatus suitable for implementing some embodiments.

In embodiments the audio object separator 122 performs the function of analysing the input audio object stream 128 in order to determine which objects can be combined with other audio signals (such as the MASA audio signal stream (104, 106)) for encoding and which audio objects are encoded as audio object specific encoding. In this regard FIG. 3 depicts an audio object separator 122 in further detail according to embodiments.

The audio object separator 122 may receive the MASA transport signals 102 and audio objects 128. Within FIG. 3 the audio objects 128 are depicted as audio object signals 1281 and audio object metadata 1282.

The audio object metadata 1282 may comprise at least a direction parameter for each audio object within the audio object stream. The audio object stream 128 comprising a plurality of audio objects The MASA audio transport signals 104 and audio object signals 1281 may be received by an energy estimator 301. In embodiments the energy estimator 301 can be arranged to estimate the energy on an audio frame basis for each audio signal channel presented to it. In other words, the energy estimator 301 may be configured to estimate the energy of each MASA transport channel signal and each audio object channel signal. Generally, the energy Et over an audio frame n may be expressed for each audio channel signal i as $$E_i(n) = \sum_{t=0}^{T-1} s_i(t)^2$$

where t=0 to T−1 are the samples of the audio frame n.

The output of the energy estimator 301, the channel energies 311 (the channel energies being the energy for each channel of the MASA transport audio signal and the energy for each channel of the audio object signal) may be passed to a temporal smoother 302.

In embodiments the temporal smoother 302 may be configured to provide smoothing function (over time) to the received channel energies 311. The smoothing operation may be expressed for each channel energy signal $E_i$ as $$E_i'(n) = (1-\alpha)E_i(n) + \alpha E_i'(n-1)$$

where $$E_i'(n)$$

is the smoothed channel energy signal for the audio frame n and audio channel signal i, and α is a smoothing coefficient, a typical value for a may take a value in the region of 0.8.

In some embodiments the above smoothing step may be omitted. In these embodiments, it is therefore the audio channel energy signals $E_i(n)$ which can be used is subsequent processing steps rather than the smoothed audio channel energy signals $$E_i'(n).$$

The smoothed audio channel energy signals $$E_i'(n)$$

312 may then be passed to the loudest selector 303. The loudest selector 303 maybe arranged to select the audio object with the largest value of smoothed audio channel energy signal for the audio frame n. That is the loudest selector can be configured to select the loudest audio object from all the audio objects. The audio object with the loudest smoothed audio channel signal (for audio frame n) may be denoted by the moniker $i_{loudest}(n)$ (the loudest audio object index 313).

In embodiments the loudest audio object index 313 $i_{loudest}(n)$ may be passed to both the audio object selector 306 and the proportion computer 304.

In embodiments the proportion computer 304 may also be arranged to receive the channel energies $E_i(n)$ 311 and the selected audio object index from the previous audio frame $i_{selected}(n-1)$ (the previous selected audio object index 317.) The previous selected audio object index 317 is the audio object index as determined by the audio object selector 306 for the previous audio frame n−1.

The proportion computer 304 may be configured to compute the proportion of the energy of the previously selected audio object and the loudest audio object in relation to the total channel energies in the current audio frame n and previous audio frame n−1. The technical effect of the proportion computer 304 may be quantified as a metric which provides a measure of the masking effect the combination of the non-selected audio objects and MASA audio signals may have on a transition between the previous selected audio object index $i_{selected}(n-1)$ 371 and the loudest object index for the current audio frame $i_{loudest}(n)$ 313. This information may then be used to guide the selection of the separated audio object(s) for the current audio frame n. The energy proportion metric $\xi(n)$, for the audio frame n, may in some embodiments be expressed as $$\xi(n) = \frac{\sum_{m=n-1}^{n} E_{i_{selected}(n-1)}(m) + E_{i_{loudest}(n)}(m)}{\sum_{m=n-1}^{n} \sum_{i=1}^{M} E_i(m)}$$

where $E_{i_{selected}(n-1)}(n-1)$ the energy of the selected audio object signal for the previous frame calculated over the previous audio frame, $E_{i_{selected}(n-1)}(n)$ and the energy of the selected audio object signal for the previous frame calculated over the current audio frame $E_{i_{loudest}(n)}(n)$ is the energy of the selected loudest audio object for the current audio frame (calculated over the current audio frame), and $E_{i_{loudest}(n)}(n-1)$ is the energy of the selected loudest audio object for the current audio frame (calculated over the previous audio frame). The term $$\sum_{m=n-1}^{n} \sum_{i=1}^{M} E_i(m)$$

expresses the sum of the energies of the MASA and all audio object signals from the previous audio frame and the MASA and all audio object signals for the current audio frame, with M being the total number of MASA audio signals and audio object signals.

The output from the proportion computer 305, the energy proportion metric $\xi(n)$ 315, may be passed to the threshold determiner 307.

In embodiments the threshold determiner 307 may be configured to compute an adaptive threshold whose function is to subsequently guide the audio object selection process. In order to achieve this the functionality of the threshold determiner 306 may follow the principles whereby if the energy proportion metric $\xi(n)$ 315 is low, then it is implied that the total energy is dominated by the MASA audio signals. In this situation, any artefacts which may occur as a result of changing the separated audio object (or selected audio object index) from one frame to the next may assumed to be adequately masked. In this instance, the threshold value should be low in order to ensure that small changes to the level of the energy of an audio object can result in a change to a newly selected separated audio object in the current audio frame. However, if the energy proportion metric 315 is of a high value, then it may be assumed that the current loudest audio object would dominate the total audio energy. This would imply that other audio signals within the total audio scene (MASA and remaining (non-separated) audio objects) would not mask any artefacts that may arise from the changing of a selected separated audio object. In this instance it would not be desirable to switch the separated audio object. To that end the following adaptive threshold equation may be used to determine whether the selected separated audio object from the previous frame should be switched to a different audio object for the current audio frame. The change threshold (for determining whether to change the selected separated audio object) $\tau_{change}(n)$ 316 for the current frame may be given as $$\tau_{change}(n) = a\xi(n) + b$$

where a and b are constants having for example, the values of a=9 and b=1. In this particular example, the above values for a and b are given in decibels.

Once the change threshold 316 has been calculated by the threshold determiner 306 it may be passed to the audio object selector 306 for further processing. Additionally, the audio object selector 306 may also be configured to receive the loudest audio object index 313 and the smoothed channel energy signals 312. The audio object selector 306 may then be configured to use the loudest audio object index $i_{loudest}(n)$ 313 to determine the smoothed energy of the loudest audio object, this may be expressed as $E_{i_{loudest}(n)}'(n)$ for audio frame n. The audio object selector 306 may also use the index of the selected separated audio object from the previous audio frame to calculate the smoothed energy of the selected separated audio objected from the previous audio frame (n−1). These two energies may be expressed as a ratio of the energy of the loudest audio object $i_{loudest}(n)$ for the current audio frame to the energy of the selected separated audio object of the previous frame $i_{selected}(n-1)$. In other words, the computed ratio r(n) may be expressed in decibels as $$r(n) = 10\log_{10}\frac{E'_{i_{loudest}(n)}(n)}{E'_{i_{selected}(n-1)}(n)}$$

The audio object selector 304 may then use the computed ratio r(n) together with the change threshold $\tau_{change}(n)$ to determine whether the separated audio object (for the current audio frame) remains as the selected separated audio object of the previous frame $i_{selected}(n-1)$ or whether the separated audio object should be switched to the loudest audio object $i_{loudest}(n)$ for the current audio frame, therefore becoming the selected separated audio object for the current audio frame. In embodiments this determination step may be performed according to the following logic $$\text{if } r(n) > \tau_{change}(n),\ i_{selected}(n) = i_{loudest}(n)$$

$$\text{if } r(n) \le \tau_{change}(n),\ i_{selected}(n) = i_{selected}(n-1)$$

The selected separated audio object index $i_{selected}(n)$ 318 for the current audio frame n is the output of the of the audio object selector 306.

In embodiments the change method determiner 305 may be arranged to determine the manner by which the selected separated audio object is switched from one frame to another for the case when the audio object selector 306 determines that there should be a change in selected separated audio objects for the current audio frame.

The change method determiner 305 may determine the manner by which a switch in the separated audio object is performed with aide of the energy proportion metric ξ(n) 315. For instance, if the energy proportion metric ξ(n) 315 is low then this would imply that other audio channel signals would mask any change to the selected separated audio object. In this case a hard switch may be used to change the selected separated audio object for the audio frame. Alternatively, if the energy proportion metric ξ(n) 315 is high this would imply that there would be no (or very little) channel masking during the switching of selected audio objects. In such circumstances it may be more prudent to use a more gradual approach to the changing of the selected separated audio objects. Such as a fading out and fading in approach, or in other words a "fadeoutfadein" selection.

This decision step may be made by comparing the energy proportion metric ξ(n) 315 to a fixed threshold $\tau_{change}$. For example, the decision may be expressed as $$\text{if } \xi(n) < \tau_{method},\ \zeta(n) = hardswitch$$

$$\text{if } \xi(n) \ge \tau_{method},\ \zeta(n) = fadeoutfadein$$

where ξ(n) denotes the chosen method of selection, the change method indicator. Experimentation has shown that a value threshold $\tau_{change}$ value in the region of 0.25 produces an advantageous result.

The output from the change method determiner 307, the change method indicator ξ(n) 319, may be used as an input to the audio object separator 308.

The audio object separator function 308 may be arranged to remove the selected separated audio object indicated by the selected separated audio object index $i_{selected}(n)$ 318 from the audio object stream. To that end, the audio object separator may be configured to receive the audio object stream which is depicted in FIG. 3 as comprising a collective of individual audio object signals (one for each audio object) 1281 and a collective of individual audio object metadata sets (one for each audio object) 1282 for the audio objects of the audio object stream 128. In other words, each audio object comprises an audio object signal (or audio signal) and an audio object metadata set. The audio object separator function 308 may then use the change method indicator 319 and the selected separate audio object index 318 to separate the selected audio object from the audio object stream 128. Consequently, this may produce a remaining audio object stream 124 comprising the remaining audio object signals 1241 and audio object metadata stream 1242. In other words, the audio object signals and metadata sets remaining when the selected separated audio object signal and metadata set have been removed from the stream 128. The audio object separator function 308 may also be arranged to produce the separated audio object stream 126 for the audio frame n. That is the audio object signal of the separated audio object 1261 and the metadata set of the separated audio object 1262.

In a first instance an audio object metadata set may comprise an azimuth $\theta_i(n)$ and elevation $\phi_i(n)$ for an audio object i and frame n.

In embodiments the audio object separator function 308 may have a number of modes of operation which can be dependent on the various parameters such as the change method indicator ξ(n) 319, the selected separated audio object index $i_{selected}(n)$ 318 and the selected separated audio object index $i_{selected}(n-1)$ for the previous audio frame n−1 317.

In one operating scenario the selected separated audio object index $i_{selected}(n)$ 318 and the selected separated audio object index $i_{selected}(n-1)$ for the previous audio frame n−1 317 may be the same, in other words there is no switch in separated audio object when transitioning from frame the previous audio frame n−1 to the current audio frame n.

In this instance the selected separated audio object signal $s_{sep}(t)$ for frame n remains the same as the previous frames selected separated audio object signal. This can be updated as:

For the case of $i_{selected}(n)=i_{selected}(n-1)$ $$s_{sep(n)}(t) = s_{i_{selected(n)}}(t) \text{ for } t = 0 \text{ to } T-1$$

Where s(t) are the samples of the audio object signal for the audio frame n, running from t=0 to T−1.

Correspondingly, an updating procedure maybe performed for the selected separated audio object metadata set, for instance the azimuth and elevation angles θ, φ.

$$\theta_{sep}(n)=\theta_{i_{selected}(n)}(n)$$

$$\phi_{sep}(n)=\phi_{i_{selected}(n)}(n)$$

With regards to the remaining audio objects, they may be simply updated for each audio object i, for all audio objects except the audio object $i=i_{selected}$ $$s_{rem(n),i}(t)=s_i(t)$$

where $s_{rem}(t)$ are the samples of a remaining audio object signal for the audio frame n, running from t=0 to T−1, for the audio object i. This is repeated for each audio object i except for the selected audio object ($i=i_{selected}$). Within the collective of remaining audio objects, the audio signal corresponding to the selected separated audio object signal can be set as zero $$s_{rem,i_{selected}(n)}(t) = 0 \text{ for } t \text{ from } = 0 \text{ to } T-1$$

In a further operating scenario the selected separated audio object index $i_{selected}(n)$ 318 and the selected separated audio object index $i_{selected}(n-1)$ for the previous audio frame n−1 317 may not be the same, in other words a switch in the separated audio object is required when transitioning from the previous audio frame n−1 to the current audio frame n. Additionally, the change method indicator $\xi(n)$ 319 may indicate that the switch can be a hard switch, i.e. $\xi(n)$=hardswitch.

In this instance the selected separated audio object signal $s_{sep}(t)$ for frame n can be set to the audio object signal corresponding selected separated audio object index $i_{selected}(n)$.

For the case of $i_{selected}(n) \neq i_{selected}(n-1)$, $s_{sep}(t)$ for frame n may be updated as $$s_{sep}(t)=s_{i_{selected}(n)}(t) \text{ for } t=0 \text{ to } T-1$$

Correspondingly, the separated audio object metadata set for frame n, maybe updated as $$\theta_{sep}(n)=\theta_{i_{selected}(n)}(n)$$

$$\phi_{sep}(n)=\phi_{i_{selected}(n)}(n)$$

As above, with regards to the remaining audio objects, they may be simply updated for each audio object i, for all audio objects except the audio object $i=i_{selected}$ $$s_{rem,i}(t)=s_i(t)$$

where $s_{rem}(t)$ are the samples of a remaining audio object signal for the audio frame n, running from t=0 to T−1, for the audio object i. This is repeated for each audio object i except for the selected audio object. As above, within the collective of remaining audio objects, the audio signal corresponding to the selected separated audio object signal can also be set as zero $$s_{rem,i_{selected}(n)}(t)=0 \text{ for } t \text{ from } 0 \text{ to } T-1$$

The remaining audio object metadata sets may be updated as $$\theta_{rem,i}(n)=\theta_i(n)$$

$$\phi_{rem,i}(n)=\phi_i(n)$$

for all for all audio objects i except audio object $i=i_{selected}(n)$.

In a another operating scenario the selected separated audio object index $i_{selected}(n)$ 318 and the selected separated audio object index $i_{selected}(n-1)$ for the previous audio frame n−1 317 may not be the same as before, in other words a switch in separated audio object is required when transitioning from frame the previous audio frame n−1 to the current audio frame n. However, in this case the change method indicator $\xi(n)$ 319 may indicate that the switch can be a fade out and fade in switch to the changeover of selected separated audio objects, i.e. $\xi(n)$=fadeoutfadein.

In this particular operating scenario, the audio object separator function 308 may be arranged to initially fade out the previous selected separated audio object from the separated audio object signal $s_{sep}(t)$ and also fade in the previous selected audio object back into the collective of remaining audio object signals $s_{rem,i}(t)$. This can have the advantage of avoiding any potential discontinuities in the audio objects signals s(t). Furthermore, the process of fading out and fading in has the further advantage of avoiding the need to perform interpolation of the audio object metadata.

In embodiments the selected separated audio object signal from the previous audio frame n−1 may be faded out from the separated audio object signal $s_{sep}(t)$ by applying a sloping window function $w_{fadeout}$ to the samples of the separated audio object signal $s_{sep}(t)$ over the length of the audio frame. For instance, the separated audio object signal for the current frame n maybe given as $$s_{sep}(t)=s_{i_{selected}(n-1)}(t)w_{fadeout}(t) \text{ for } t=0 \text{ to } T-1,$$

with the time samples 0 to T−1 being the samples of the current audio frame n of length T. Where $s_{i_{selected}(n-1)}(t)$ is the selected separated audio object signal from the previous audio time frame n−1.

In embodiments the shape of the fading out window applied to the samples of the separated audio object signal may take the form of a later half of a Hann window function as given by $$w_{fadeout}(t) = \frac{1+\cos\frac{\pi t}{T}}{2}$$

In terms of the audio object metadata, the separated audio object metadata for the current audio frame n maybe follow the same procedure as above and be set as $$\theta_{sep}(n)=\theta_{i_{selected}(n)}(n)$$

$$\phi_{sep}(n)=\phi_{i_{selected}(n)}(n)$$

As mentioned above the selected separated audio object signal for the previous frame $s_{i_{selected}(n-1)}$ may be faded in (or phased in) the collective of remaining audio object signals for the current audio frame n, $s_{rem,i}(t)$. In embodiments this may be performed by applying a fading in window function over the samples of the selected separated audio object signal for the previous frame $s_{i_{selected}(n-1)}$ for the length of the current frame n. This fading in process for the remaining audio object signals may be expressed as $$s_{rem,i_{selected}(n-1)}(t) = s_{i_{selected}(n-1)}(t)w_{fadein}(t) \text{ for } t=0 \text{ to } T-1$$

In embodiments the shape of the fading in window applied to the samples of the separated audio object signal may take the inverse form of the latter half of the Hann window function as given by $$w_{fadein}(t) = 1 - w_{fadeout}(t)$$

As above the other remaining audio object signals are updated accordingly to be the same audio object signals from the previous audio frame, $$s_{rem,i}(t) = s_i(t) \text{ for } t=0 \text{ to } T-1$$

for all audio objects i except audio object $i=i_{selected}(n-1)$.

Similarly, the audio object metadata sets for the remaining audio objects can be updated in a similar manner.

$$\theta_{rem,i}(n)=\theta_i(n)$$

$$\phi_{rem,i}(n)=\phi_i(n)$$

for all audio objects i except audio object $i=i_{selected}(n)$

During the next audio frame the current selected separated audio object signal $s_{i_{selected}(n)}(t)$ may be faded (or phased) out from the remaining audio object signals $s_{rem,i}(t)$ over the course of the audio frame. Also, during the audio frame the current selected separated audio object signal can be faded into the separated audio object signal $s_{sep}(t)$.

In embodiments the removing of the current selected separated audio object signals from the collective of remaining audio object signals during the next audio frame may be expressed as $$s_{rem,i_{selected}(n)}(n)(t+T) = s_{i_{selected}(n)}(t+T)w_{fadeout}(t) \text{ for } t = 0 \text{ to } T-1.$$

The other remaining audio object signals may be updated by simply maintaining the audio object signals from the previous audio frame. That is $$s_{rem,i}(t+T) = s_i(t+T) \text{ for } t = 0 \text{ to } T-1$$

for all audio objects i except audio object $i=i_{selected}(n)$.

The fading in of the current selected separated audio object signal to the separated audio object signal $s_{sep}(t)$ may be expressed as $$s_{sep}(t+T) = s_{i_{selected}(n)}(t+T)w_{fadein}(t) \text{ for } t = 0 \text{ to } T-1$$

Furthermore, the remaining audio object signals for the next

In terms of the separated audio object metadata set for this "next" audio frame n+1, the selected separated audio object metadata set (index or identifier) remains the same, i.e. $i_{selected}(n)$. However, the values of the separated audio object metadata set can be updated to have the values of the meta data for the selected separated audio object $i_{selected}(n)$ for the next audio frame n+1. This may be expressed as $$\theta_{sep}(n+1) = \theta_{i_{selected}(n)}(n+1)$$

$$\phi_{sep}(n+1) = \phi_{i_{selected}(n)}(n+1)$$

Similarly, the collective of remaining audio object metadata sets for the "next" audio frame n+1 may be maintained by having the same audio object members, i.e. all audio object indexes i remain the same for this frame as the previous frame. However, the values of the audio object metadata sets are updated to the values for the next audio frame. This may be expressed as for all audio objects i except audio object $i=i_{selected}(n)$.

$$\theta_{rem,i}(n+1) = \theta_i(n+1)$$

$$\phi_{rem,i}(n+1) = \phi_i(n+1)$$

As stated above, the output from the audio object separator 122 may comprise the remaining audio objects comprising 124 the remaining audio object signals 1241 and audio object metadata stream 1242. The output may further comprise the separated audio object 126 comprising the audio transport signal of the separated audio object 1261 (the audio object signal) and the metadata set of the separated audio object 1262.

Returning to FIG. 1, the separated audio object 126 may be passed to a dedicated audio object encoder 121 within the encoder 107. The audio object encoder 121 maybe arranged to specifically encode audio objects. The output from the audio object encoder 121 may then be the encoded separated audio object 117.

Meanwhile, the remaining audio object stream 124 may be passed to the combined encoding core 109 (within the encoder 107), whereby the remaining audio object stream may be encoded together with the MASA transport audio signals 104 and metadata 106.

The combined encoder core 109 which may be configured to receive the MASA transport audio (for example downmix) signals 104 and remaining audio object signals 1241 in order to generate a suitable encoding of these audio signals as encoded transport audio signals 115. The combined encoder core 109 may furthermore comprise a spatial parameter set encoder which may be configured to receive the MASA metadata 106 and remaining audio object metadata 1241 and output an encoded or compressed form of the information as Encoded metadata 116.

In embodiments, the combined encoder core 109 may receive the MASA transport audio (for example downmix) signals 104 and remaining audio object signals 1241. Within the combined encoder core 109 the object transport audio signal may be created, for example by downmixing to a stereo. These object transport audio signals are then to be mixed together with MASA transport audio signals resulting in a combined transport audio signal set (e.g., stereo signals) for encoding. The encoding of the combined transport audio signal may be performed by an encoder, examples of which may include the 3GPP Enhanced Voice Service codec or the MPEG Advanced Audio Codec.

The encoder 107 can in some embodiments be a computer or mobile device (running suitable software stored on memory and on at least one processor), or alternatively a specific device utilizing, for example, FPGAs or ASICs. The encoding may be implemented using any suitable scheme. In some embodiments the encoder 107 may further interleave, multiplex to a single data stream or embed the encoded combined metadata, encoded combined audio transport signals, encoded separated audio object metadata, encoded separated audio object signal before transmission or storage shown in FIG. 1 by the dashed line. The multiplexing may be implemented using any suitable scheme.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport and metadata.

In FIG. 1 the analysis part (analysis processor 105, transport signal generator 103 and audio object separator 122) is depicted as being coupled together with the encoder 107. However, it is to be appreciated that some embodiments may not so tightly couple these two respective processing entities such that the analysis part can exist on a different device from the encoder 107. Consequently, a device comprising the encoder 107 may be presented with the transport signals and metadata streams for processing and encoding independently from the process of capturing and analysing.

Figure 2:
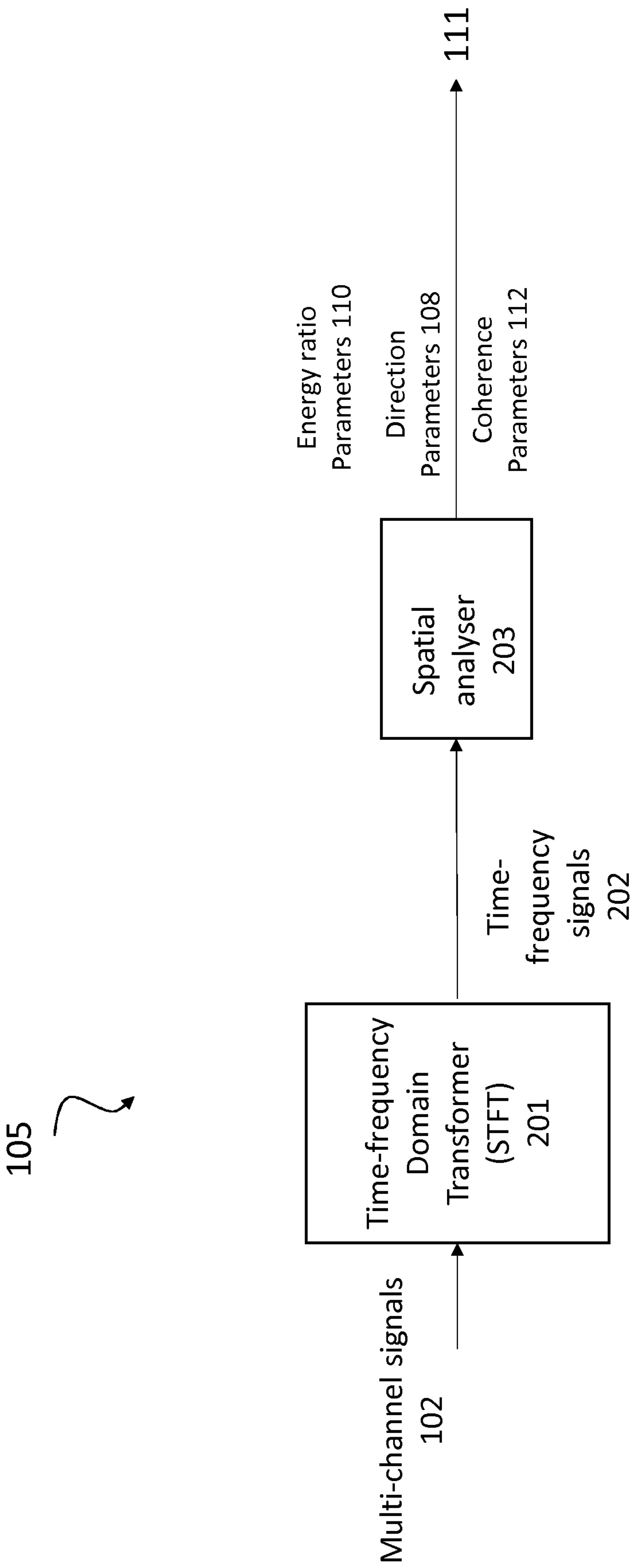
FIG. 2 shows schematically an analysis processor according to some embodiments.

With respect to FIG. 2 an example analysis processor 105 is shown in further detail for the processing of a multichannel input signal. FIG. 2, is shown in the context of providing the processing and analysis for generating the MASA Metadata and MASA transport audio signal.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$S(b,n,i),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (n,k) (or block) is thus a specific sub band k within a subframe of the frame n.

It can be appreciated that the number of bits required to represent the spatial audio parameters may be dependent at least in part on the TF (time-frequency) tile resolution (i.e., the number of TF subframes or tiles). For example for the "MASA" input multi-channel audio signals, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits per sound source direction. For two sound source directions per TF tile there would be a need of 2×64 bits for the complete encoding of both directions. It is to be noted that the use of the term sound source can signify dominant directions of the propagating sound in the TF tile.

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth $\phi_{MASA}$(k, n), and elevation $\theta_{MASA}$(k, n). The direction parameters 108 for the time sub frame may be passed to the MASA spatial parameter set (metadata) set encoder 111 for encoding and quantizing.

The spatial analyser 203 may also be configured to determine an energy ratio parameter 110. The energy ratio may be considered to be a determination of the energy of the audio signal which can be considered to arrive from a direction. The direct-to-total energy ratio $r_{MASA}$(k, n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In general, the direct-to-total energy ratio parameter for multi-channel captured microphone array signals can be estimated based on the normalized cross-correlation parameter cor'(k, n) between a microphone pair at band k, the value of the cross-correlation parameter lies between −1 and 1. A direct-to-total energy ratio parameter r(k, n) can be determined by comparing the normalized cross-correlation parameter to a diffuse field normalized cross correlation parameter $cor_D$'(k, n) as $$r(k,n) = \frac{cor'(k,n) - cor'_D(k,n)}{1 - cor'_D(k,n)}.$$

The direct-to-total energy ratio is explained further in PCT publication WO2017/005978 which is incorporated herein by reference.

For the case of the multi-channel input audio signals the direct-to-total energy ratio parameter $r_{MASA}$(k, n) ratio may be passed to the MASA spatial parameter set (metadata) set encoder 111 for encoding and quantizing The spatial analyser 203 may furthermore be configured to determine a number of coherence parameters 112 (for the multi-channel signals 102) which may include surrounding coherence ($\gamma_{MASA}$(k, n)) and spread coherence ($\zeta_{MASA}$(k,n)), both analysed in time-frequency domain.

The spatial analyser 203 may be configured to output the determined coherence parameters spread coherence parameter $\zeta_{MASA}$ and surrounding coherence parameter $\gamma_{MASA}$ to the MASA spatial parameter set (metadata) set encoder 111 for encoding and quantizing.

Therefore, for each TF tile there will be a collection of MASA spatial audio parameters associated with each sound source direction. In this instance each TF tile may have the following audio spatial parameters associated with it on a per sound source direction basis; an azimuth and elevation denoted as azimuth $\phi_{MASA}$(k, n), and elevation OMASA (k, n), a spread coherence ($\gamma_{MASA}$(k,n)) and a direct-to-total energy ratio parameter $r_{MASA}$(k, n). In addition, each TF tile may also have a surround coherence ($\zeta_{MASA}$(k, n)) which is not allocated on a per sound source direction basis.

In a manner similar to that of the processing performed by the analysis processor 105, an audio object analyser within the combined encoder core 109 and an audio object analyser within the audio object encoder 121 may analyse their respective input audio object streams to each produce an audio object time frequency domain signal which may be denoted as $$S_{obj}(b,n,i),$$

Where, as before b is the frequency bin index and n is the time-frequency block (TF tile) (frame) index and i is the channel index. The resolution of the audio object time frequency domain signal may be the same as the corresponding MASA time frequency domain signal such that both sets of signals may be aligned in terms of time and frequency resolution. For instance, the audio object time frequency domain signal $S_{obj}(b, n, i)$, may have the same time resolution on a TF tile n basis, and the frequency bins b may be grouped into the same pattern of sub bands k as deployed for the MASA time frequency domain signal. In other words, each sub band k of the audio object time frequency domain signal may also have a lowest bin $b_{k,low}$ and a highest bin $b_{k,high}$, and the subband k contains all bins from $b_{k,low}$ to $b_{k,high}$.

It is to be noted that the audio object time frequency domain signal may be termed the audio object signals 1281 (in FIG. 3) and the MASA time frequency domain signal may be termed the MASA transport audio signals 104 in FIG. 1.

Figure 4:
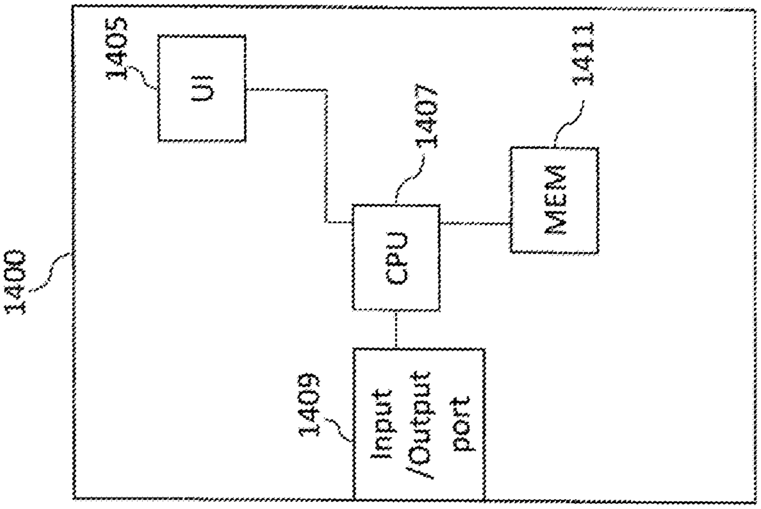
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code.

The input/output port 1409 may be coupled to any suitable audio output for example to a multi-channel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for spatial audio signal encoding comprising:

determining an energy of each of a plurality of audio object signals over an audio frame to give a plurality of audio object signal energies, wherein each audio object signal is associated with an audio object of a plurality of audio objects of the audio frame;

determining an energy of at least one audio signal of another input audio format over the audio frame;

determining a loudest audio object by selecting an audio object with an audio object signal energy which is a largest audio object signal energy from the plurality of audio object signal energies;

determining an energy proportion factor;

determining a threshold value for the audio frame according to the energy proportion factor;

determining a ratio of the audio object signal energy of the loudest audio object to an energy of a separated audio object signal for a previous audio frame, wherein the energy of the separated audio object signal for the previous audio frame is calculated over the audio frame, and wherein the separated audio object signal for the previous audio frame is associated with an audio object separated in the previous frame;

comparing the ratio of the audio object signal energy of the loudest audio object to the energy of the separated audio object signal for the previous audio frame against the threshold value;

depending on the comparison identifying for the audio frame, either the loudest audio object as an audio object for separation, or the audio object separated in the previous frame as the audio object for separation;

separating the audio object for separation from the plurality of audio objects of the audio frame to provide a separated audio object and at least one remaining audio object for the audio frame;

encoding the separated audio object with an audio object encoder; and combining the encoding of the at least one remaining audio object together with the encoding of the another input audio format.

2. The method as claimed in claim 1, wherein determining the energy proportion factor comprises:

determining a total energy by summing the energy of each of the plurality of audio object signals over the audio frame, the energy of each of a plurality of audio object signals over the previous audio frame, the energy of the at least one audio signal of the other audio input format over the audio frame and the energy of the at least one audio signal of the other audio input format over the previous audio frame; and determining the ratio of a sum energy to the total energy, wherein the sum energy is the sum of the loudest audio object signal energy of the loudest audio object, an audio object signal energy of a loudest audio object from the previous audio frame, the energy of the separated audio object signal for the previous audio frame and an energy of the separated audio object signal for the previous audio frame calculated over the previous audio frame.

3. The method as claimed in claim 1, wherein the method further comprises determining a manner of transition by which a change from the audio object separated in the previous audio frame to the separated audio object for the audio frame is performed.

4. The method as claimed in claim 3, wherein determining the manner of transition comprises:

comparing the energy proportion factor against a further threshold;

determining that the manner of transition from the audio object separated in the previous audio frame to a separated audio object for the audio frame is performed using a hard transition when the energy proportion factor is less than the threshold; and determining that the manner of transition from the audio object separated in the previous audio frame to the separated audio object for the audio frame is performed using a fade out fade in transition when the energy proportion factor is greater than or equal to the threshold.

5. An apparatus comprising at least one processor and at least one memory including computer program code, the at least one memory and the computer program code configured to, with the at least one processor, cause the apparatus at least to:

determine an energy of each of a plurality of audio object signals over an audio frame to give a plurality of audio object signal energies, wherein each audio object signal is associated with an audio object of a plurality of audio objects of the audio frame;

determine an energy of at least one audio signal of another input audio format over the audio frame;

determine a loudest audio object by selecting an audio object with a largest audio object signal energy which is a largest audio object signal energy from the plurality of audio object signal energies;

determine an energy proportion factor;

determine a threshold value for the audio frame according to the energy proportion factor;

determine a ratio of the audio object signal energy of the loudest audio object to an energy of a separated audio object signal for a previous audio frame, wherein the energy of the separated audio object signal for the previous audio frame is calculated over the audio frame, and wherein the separated audio object signal for the previous audio frame is associated with an audio object separated in the previous frame;

compare the ratio of the loudest audio object signal energy of the loudest audio object to the energy of the separated audio object signal for the previous audio frame against the threshold value;

depending on the comparison identify for the audio frame, either the loudest audio object as an audio object for separation, or the audio object separated in the previous frame as the audio object for separation;

separate the audio object for separation from the plurality of audio objects of the audio frame to provide a separated audio object and at least one remaining audio object for the audio frame;

encode the separated audio object with an audio object encoder; and combine the encoding of the at least one remaining audio object together with the encoding of the another input audio format.

6. The apparatus as claimed in claim 5, wherein the apparatus caused to determine the energy proportion factor is caused to:

determine a total energy by summing the energy of each of the plurality of audio object signals over the audio frame, the energy of each of a plurality of audio object signals over the previous audio frame, the energy of the at least one audio signal of the other audio input format over the audio frame and the energy of the at least one audio signal of the other audio input format over the previous audio frame; and determine the ratio of a sum energy to the total energy, wherein the sum energy is the sum of the audio object signal energy of the loudest audio object, an audio object signal energy of a loudest audio object from the previous audio frame, the energy of the separated audio object signal for the previous audio frame calculated over the audio frame and an energy of the separated audio object for the previous audio frame calculated over the previous audio frame.

7. The apparatus as claimed in claim 5, wherein the apparatus is further caused to determine a manner of transition by which a change from the audio object separated in the previous audio frame to the separated audio object for the audio frame is performed.

8. The apparatus as claimed in claim 7, wherein the apparatus caused to determine the manner of transition is caused to:

compare the energy proportion factor against a further threshold;

determine that the manner of transition from the audio object separated in the previous audio frame to a separated audio object for the audio frame is performed using a hard transition when the energy proportion factor is less than the threshold; and determine that the manner of transition from the audio object separated in the previous audio frame to the separated audio object for the audio frame is performed using a fade out fade in transition when the energy proportion factor is greater than or equal to the threshold.

9. The apparatus as claimed in claim 5, wherein the apparatus is further caused to:

provide a separated audio object for at least one following audio frame and a plurality of remaining audio objects for the at least one following audio frame, wherein that least one following audio frame follows the audio frame; set the audio object signal of the separated audio object for the audio frame as the audio object signal of the audio frame of the separated audio object for the previous audio frame multiplied by a fading out window function;

set an audio object signal of the separated audio object for the at least one following audio frame as the audio object signal of the at least one following audio frame of the audio object for separation multiplied by a fading in window function;

set an audio object signal corresponding to the separated audio object for the previous audio frame within the at least one remaining audio object for the audio frame as the audio object signal for the audio frame of the separated audio object from the previous audio multiplied by a fading in window function; and set an audio object signal corresponding to the separated audio object for the audio frame within the at least one remaining audio object for the at least one following audio frame as the audio object signal of the audio object for separation multiplied by a fading out window function.

10. The apparatus as claimed in claim 9, wherein the manner of transition from the separated audio object signal for the previous audio frame to a separated audio object signal for the audio frame is performed using the fade in fade out transition.

11. The apparatus as claimed in claim 9, wherein the fading out window function is a latter half of a Hann window function and wherein the fading in window function is one minus the latter half of the Hann window function.

12. The apparatus as claimed in claim 5, wherein the apparatus caused to determine the energy of each of the plurality of audio object signals over an audio frame is further caused to smooth the energy of each of the plurality of audio object signals by using an energy of a corresponding audio object signal from a previous audio frame.

13. The apparatus as claimed in claim 5, wherein the other input audio format comprises at least one of:

at least one audio signal and an input audio format metadata set; and at least two audio signals.

* * * * *